United States Patent [19]

Kobayashi

[11] Patent Number: 4,979,818

[45] Date of Patent: Dec. 25, 1990

[54] APPARATUS FOR MEASURING MOVEMENT OF LIGHT SCATTERING BODIES IN AN OBJECT

[75] Inventor: Koji Kobayashi, Hino, Japan

[73] Assignee: Kowa Company Ltd., Japan

[21] Appl. No.: 262,524

[22] Filed: Oct. 25, 1988

[30] Foreign Application Priority Data

Oct. 28, 1987 [JP] Japan .................... 62-270443

[51] Int. Cl.$^5$ ............... G01P 3/36; A61B 5/02
[52] U.S. Cl. ................... 356/28; 356/338; 356/342; 128/691
[58] Field of Search ............ 356/337–340, 356/342, 28, 28.5; 128/691

[56] References Cited

U.S. PATENT DOCUMENTS

| | | | |
|---|---|---|---|
| 3,737,233 | 6/1973 | Blau et al. | 356/28 |
| 4,715,706 | 12/1987 | Wang | 356/5 |
| 4,721,385 | 1/1988 | Jelalian et al. | 356/5 |
| 4,743,107 | 5/1988 | Aizu et al. | 356/28.5 X |

*Primary Examiner*—Thomas H. Tarcza
*Assistant Examiner*—Linda J. Wallace
*Attorney, Agent, or Firm*—Bruce L. Adams; Van C. Wilks

[57] ABSTRACT

A velocity distribution measurement apparatus directs light at an object, detects scattered light from the object, photoelectrically converts the light and subjects it to signal processing to obtain velocity distribution characteristics of the object, by detecting a speckle pattern formed by interference between rays of light scattering from points on the object. The apparatus consists mainly of a laser beam source; an optical deflector for scanning the laser at a certain frequency; an optical system for projecting the light scanned by the deflector onto the object; a detector for detecting the speckle pattern; and signal processing means for analyzing detector outputs to establish the speckle pattern variations for each scanning frequency at which the optical deflector performs scanning, in order to obtain information on velocity distribution in the object. The optical system is easy to adjust, and measurement and processing can be accomplished in a relatively short time.

18 Claims, 5 Drawing Sheets

APPARATUS FOR MEASURING MOVEMENT OF LIGHT SCATTERING BODIES IN AN OBJECT

BACKGROUND OF THE INVENTION

1. Field of the Invention

This invention relates to a velocity distribution measurement apparatus, and particularly to a velocity distribution measurement apparatus for obtaining velocity distribution characteristics in an object by projecting a beam of coherent light at the object, using a photosensor to pick up and photoelectrically convert the light scattered by the object, and subjecting it to electronic signal processing.

2. Description of the Prior Art

Conventional means which use coherent light such as a laser beam to measure the velocity of a moving object such as, for example, the velocity of a fluid flowing in a glass tube, or of the blood flow in the blood vessel of an eye fundus or other such living organism, include the laser Doppler velocity meter and the laser speckle velocity meter.

With the laser Doppler velocity meter, the laser beam is focused on the measurement zone of the object and the amount of Doppler frequency shift in the light scattered by the object is detected and used to obtain a measurement of the velocity of any scattering bodies in the zone (see, for example, Applied Optics, Vol.24(1985) page 605 or Vol. 25(1986) page 649). The features of this method are high spatial resolution at the point of measurement and good accuracy.

The laser speckle velocity meter involves directing the laser beam onto the object and detecting a speckle pattern produced in the light scattered by the object, then subjecting the detection signals to autocorrelation or cross-correlation functions to determine the velocity of the scattering bodies ( see, for example, Applied Optics, Vol.23(1984) page 2353 or Vol.25(1986) page 22). The feature of this method is that generally the optical system is easy to handle. Here, "speckle pattern" means the irregular pattern of speckles that appear in scattered light from diffusers such as ground glass, coarse metal surfaces, paper, walls and the like subjected to illumination by coherent light, the speckles being produced by interference between the rays of light scattering from each of the points of the diffuser.

There are methods of electronically measuring velocity distribution in an object in one or two dimensions based on such means. However, there are problems with these. For example, to find velocity distributions using the laser Doppler method involves moving either the entire optical system or the object itself or using frequency shifters and TV camera, and the apparatus has a complex structure (see, for example, Applied Optics, Vol.22(1983) page 2448). The laser Doppler velocity meter is particularly difficult to use, the exacting conditions imposed by the optical system making alignment difficult, while the method involving moving the object itself limits the objects that can be measured. Another problem is that the measurement process can become very lengthy if the number of measurement points is raised in order to increase the amount of spatial information.

Apparatuses employing the laser speckle pattern method, using for example a point type optical detector and calculating velocity by using auto-correlation functions on the detection signals, are inherently suited to velocity measurements in a single measurement zone of an object. With this method too, it would be necessary to move the optical system or the object itself, or it would also be necessary to arrange the optical detectors in parallel, which again leads to structural complexity. Again, of course, the method for moving the object limits the objects that can be measured, and again there is the problem that the measurement process can become very lengthy if the number of measurement points is raised in order to increase the amount of spatial information.

Another method of measuring velocity distribution in an object consists of using a CCD or imaging tube to form an optical detector that functions to pick up the speckle pattern in one or two dimensions, and subjecting the detection signals to autocorrelation, or computing variations in the detection signals ( see, for example, Applied Optics, Vol.26(1987) page 5321). However, because the optical detector used in these methods is a one- or two-dimensional image sensor, the quantum efficiency is low, compared to a point-type detector such as a photomultiplier or the like, and when the reflectivity or transmissivity of the object is low, the S/N ratio of the detection signal makes measurement difficult, while another problem that arises when operations such as cross-correlation functions are used is the increasing time required for the computation, making it difficult to increase the number of measurement points.

SUMMARY OF THE INVENTION

The object of the present invention is to provide a velocity distribution measurement apparatus having an optical system that is easy to adjust, does not require that the object be moved, needs only a relatively short time for the measurements even when many measurement points are being used, and which can be applied even when the reflectivity or transmissivity of the object is low.

To attain this object, the present invention comprises a velocity distribution measurement apparatus which directs light at an object, detects scattered light from the object, photoelectrically converts the light and subjects it to signal processing to obtain velocity distribution characteristics of the object, comprising: a light source for generating coherent light; an optical deflector for scanning the coherent light at a predetermined frequency; an optical system for projecting the coherent light scanned by the optical deflector at the object; an optical detector for detecting a speckle pattern formed in the scattered light from the object passing through a limiting aperture; and signal processing means for analyzing from the output signal of the optical detector the state of speckle pattern variations at each frequency at which the optical deflector performs scanning, in order to obtain information on velocity distribution in the object.

The invention further comprises a velocity distribution measurement apparatus which directs light at an object, detects scattered light from the object, photoelectrically converts the light and subjects it to signal processing to obtain velocity distribution characteristics of the object which is also capable of acquiring two-dimensional image data showing optical reflection or transmission characteristics in the object, comprising: a light source for generating coherent light; a first optical deflector for scanning the coherent light at a predetermined frequency; a second optical deflector for scanning the coherent light at a predetermined frequency in a direction that is perpendicular to the direction of scanning by the first optical detector; an optical system for projecting the coherent light scanned two-dimensionally by the first and second optical deflectors at the object; a first optical detector for detecting a speckle pattern formed in the scattered light from the object passing through a limiting aperture; signal processing means for analyzing from the output signal of the first optical detector the state of speckle pattern variations in order to obtain information on velocity distribution in the object; and a second optical detector for detecting optical reflection or transmission characteristics in the object.

With this type of arrangement, as the measurement principle utilized is essentially that of the laser speckle method, adjustment of the optical system is a simple matter. Also, as the laser beam is scanned it is unnecessary to move the object, so the measurement can be accomplished in a relatively short time, even when there are many measurement points. Also, as the optical detector is a high-sensitivity point-type constituted of, for example, a photomultiplier tube or the like, it can be used even when the object has a low reflectivity or transmissivity. Furthermore, with a configuration that performs two-dimensional optical deflection, in addition to the specified two-dimensional velocity distribution data it also becomes possible to acquire image data of ordinary reflection or transmissivity characteristics of the object.

BRIEF DESCRIPTION OF THE DRAWINGS

The objects and features of the present invention will become more apparent from a consideration of the following detailed description taken in conjunction with the accompanying drawings in which.

DETAILED DESCRIPTION OF THE PREFERRED EMBODIMENTS

The embodiments of the present invention will now be described in the following with reference to FIGS. 1 to 5.

Figure 1:
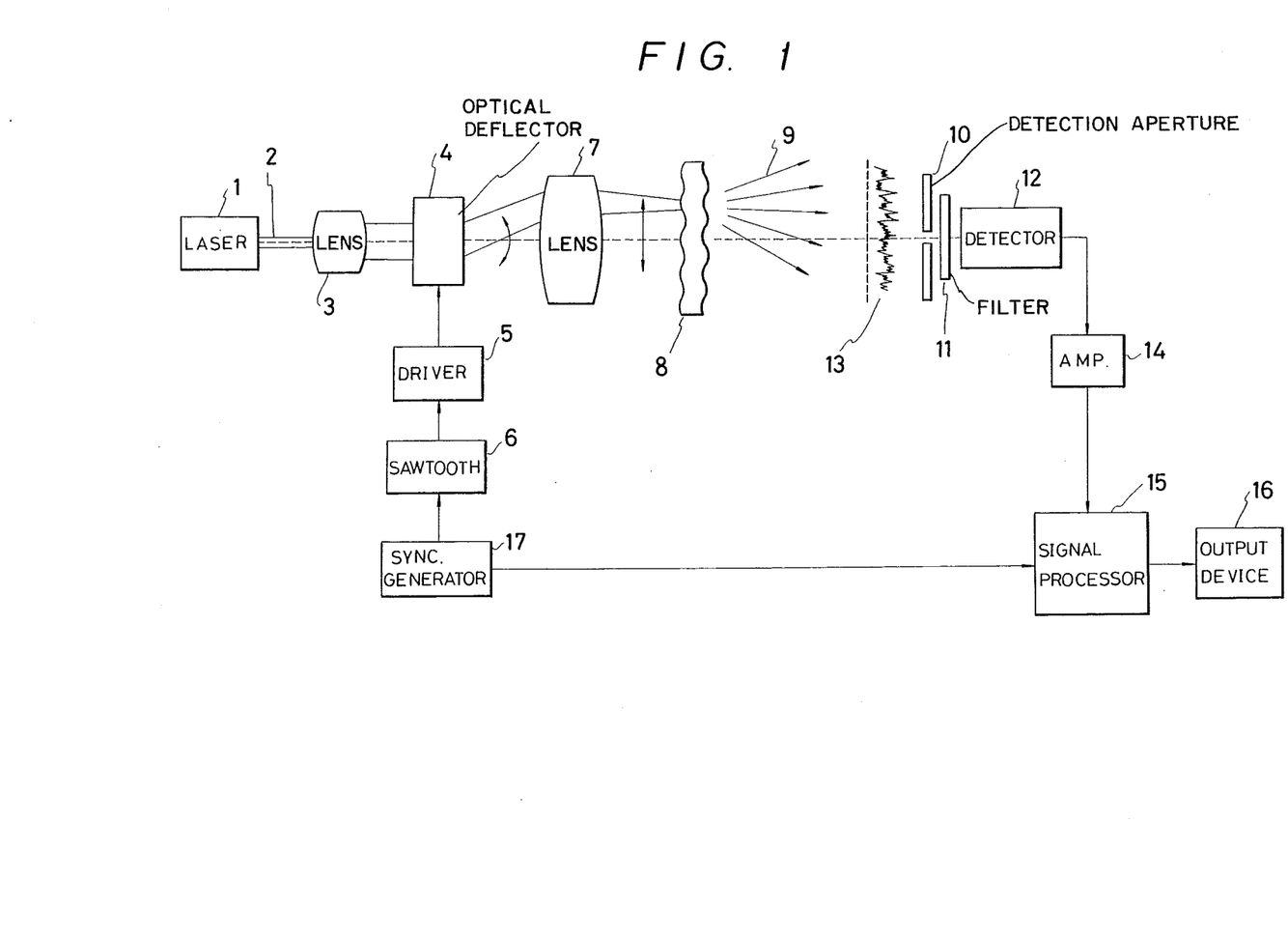
FIG. 1 is a schematic illustration of the overall configuration of an apparatus according to the present invention for measuring velocity distribution one-dimensionally.

FIG. 1 illustrates the overall configuration of an apparatus according to the present invention, for measuring velocity distribution one-dimensionally. In FIG. 1, reference numeral 1 denotes a helium-neon (He-Ne), argon (Ar+), or semiconductor laser light source capable of producing coherent light. A laser beam 2 produced by the laser light source 1 is expanded to a specific size by a lens 3 and then impinges an optical deflector 4, whereby it is scanned. In the present embodiment the optical deflector 4 is an acousto-optical deflector (AOD). Although an optical deflector may also be constituted by an oscillating mirror or polygonal rotating mirror as well as by an AOD, the apparatus according to the present invention requires an optical deflector with a high iterative scan precision, and at this point an AOD is the most suitable. Connected to the AOD 4 is a driver 5 which is controlled by sawtooth waveforms produced by a sawtooth waveform generator 6. The laser beam swept by the deflector 4 passes through a lens 7 and is projected onto an object 8.

Part of the scattered light 9 from the object 8 passes through a detection aperture 10 and a filter 11 adapted to the wavelength of the laser beam and is detected and photoelectrically converted by an optical detector 12. The optical detector 12 is comprised of a high-sensitivity point-type photosensor, such as a photomultiplier tube or avalanche photodiode. The interference between rays of the light 9 scattering from the surface irregularities of the object 8 give rise to the type of irregular speckle pattern 13 depicted in FIG. 1. The purpose of the detection aperture 10 is to detect a representative portion of the detailed structure of this speckle pattern, and for this the size of the aperture corresponds to an approximation of the mean diameter of the speckles. Generally such an aperture consists of a single pinhole, such as the one shown in FIG. 1, but the aperture could instead consist of a multiplicity of pinholes arranged randomly or in an array. The output signals from the optical detector 12 are amplified to the required level by an amplifier 14 and then processed by a signal processor 15. The processed signals are then sent to an output device 16 such as a television monitor to display the velocity distribution.

The laser beam scanning control system and the photosensor-side signal processing and output system are synchronized by a synchronizing signal from a synchronizing signal generator 17, which makes it possible to exercise time-based control of the overall system.

Figure 2:
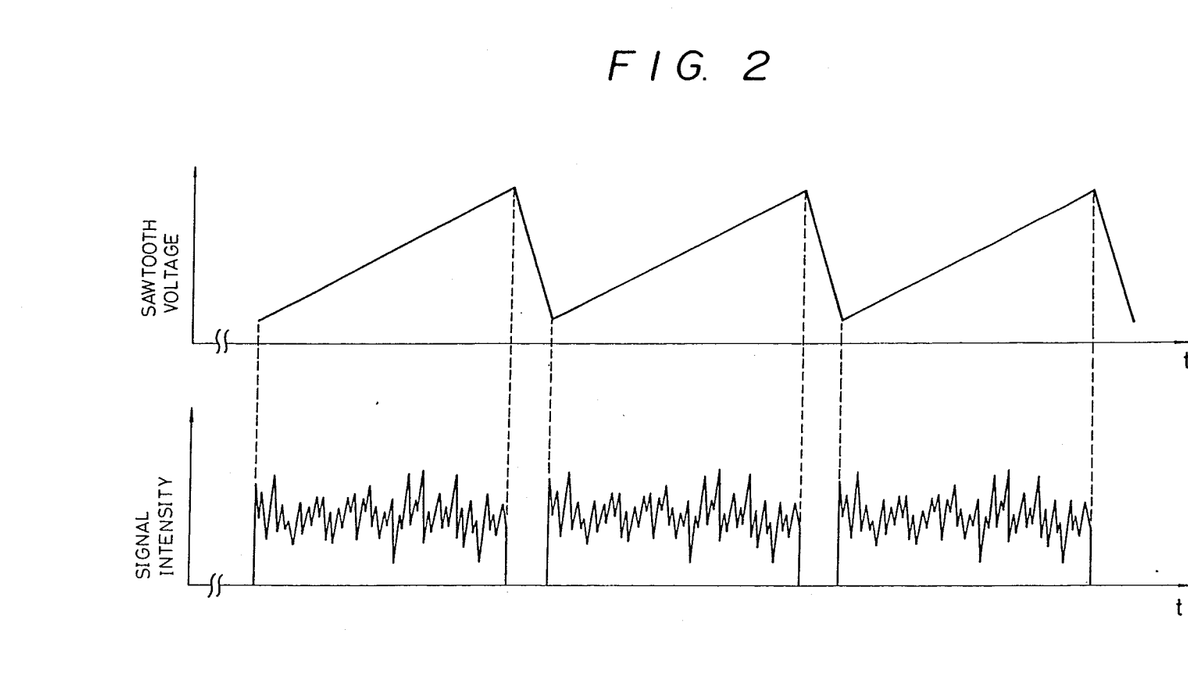
FIG. 2 is a graph showing the waveform of the output signal of the optical detector in FIG. 1.

FIG. 2 shows the waveform of the output signal of the optical detector 12 of FIG. 1 together with the sawtooth waveform signals used for controlling the laser-beam scanning. The output signals from the sawtooth waveform generator 6 are shown in the upper half of the figure; one sawtooth waveform represents one laser-beam scanning period, i.e., the period during which the laser beam makes a single traverse of the object. If it is assumed that there is no movement of scattering bodies in the object, i.e., that at any point in the object the velocity distribution is zero, and that the laser beam scanning is highly accurate, meaning that the beam returns to exactly the same spot on the object every period, the speckle pattern observed in the diffused light will be the same each period. The result of this would be the output from the optical detector of random signals having the same waveform each period, as shown in FIG. 2.

Figure 3A:
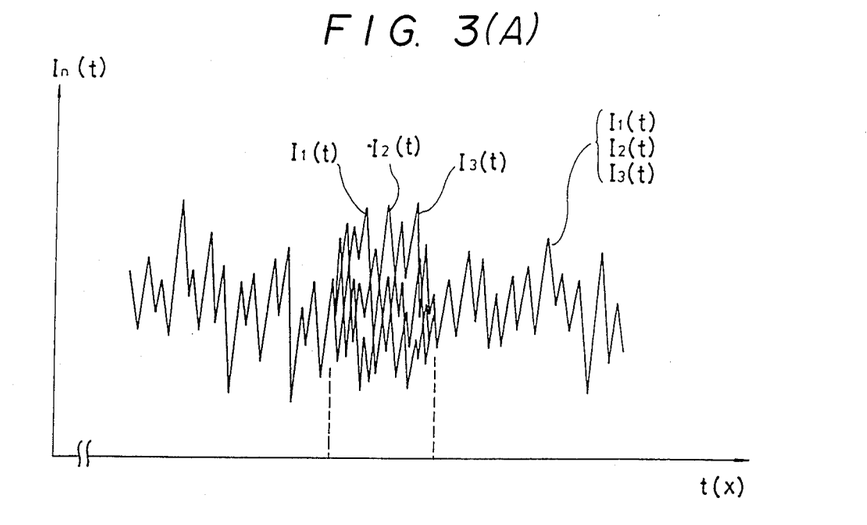
FIGS. 3A and 3B are explanatory diagrams for explaining the velocity distribution measurement principle.
Figure 3B:
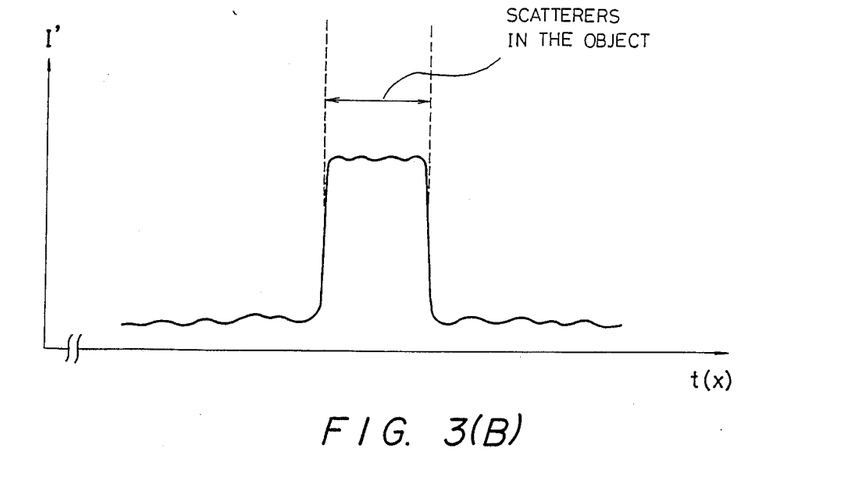

FIGS. 3A and 3B are explanatory diagrams for explaining the velocity distribution measurement principle. Unlike the case of FIG. 2, FIG. 3A depicts the superimposition each period of three periods of detector output signals. As such, as well as the horizontal axis of FIGS. 3A and 3B representing time (t), it can also be considered as corresponding to distance x on the object. If the signals of the three-period portion are $I_1(t)$, $I_2(t)$ and $I_3(t)$, here they will show any movement of scattering bodies in the middle part of the object. As is apparent from the figure, when there is movement of scattering bodies in the object, the signals $I_n(t)$ obtained each period will only fluctuate during the time the scanning laser beam is within the part where the movement is.

Therefore, signals can be obtained having an amplitude that corresponds to the type of degree of movement illustrated by FIG. 3B by calculating the mean value of absolute variations in signals between periods, thus:

$$I' = 1/n \ \Sigma_n \ | I_{n+1}(t) - I_n(t) |$$

With reference to FIG. 3B, the movement of scatterers in the center part of the object has produced an increase in the amplitude of the signal in the middle of the waveform, forming a direct indication of the velocity distribution of scattering bodies in the object.

As will be apparent from this principle, in the technique of the present invention, high iterative precision of the scanning laser beam is of critical importance. Unless the beam returns to the same spot on the object each period, the speckle pattern formed in the diffused light will differ from one period to the next. This would also cause the output signals from the optical detector to fluctuate from period to period, making it impossible to know whether it was the movement of scattering bodies in the object that was being detected, or the variations of the scanning laser beam. It is for this reason that an optical detector having a high iterative scan precision is required for the apparatus of this invention. An AOD was therefore considered to be ideal for the purpose, being entirely free of any mechanically vibrating parts. If use should be made of a mechanical deflector, in view of the scanning frequency it should be one offering good precision, with minimal shaft run-out and the like.

Figure 4:
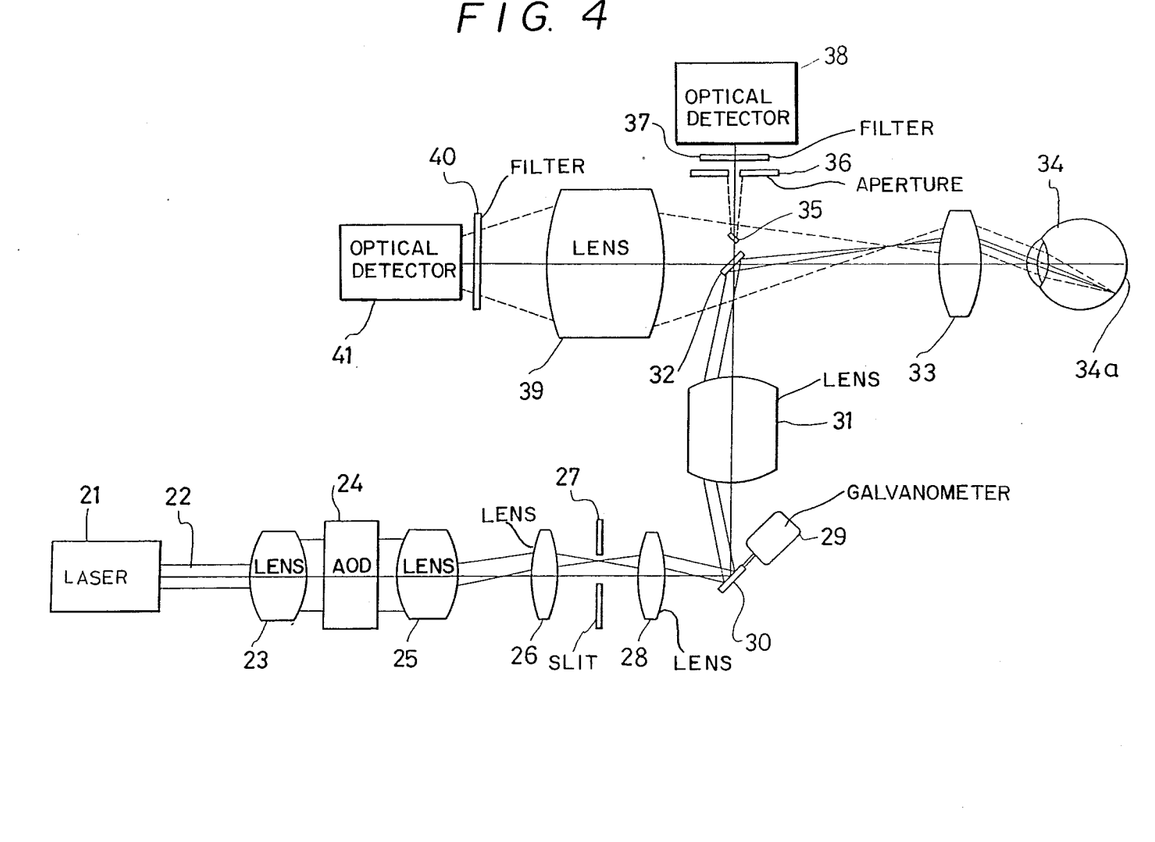
FIG. 4 is a schematic illustration of the overall configuration of an apparatus according to the present invention for measuring velocity distribution two-dimensionally.

FIG. 4 shows the configuration mainly of the optical system of an apparatus according to another embodiment of the present invention. With reference to FIG. 4, the object of the measurement is assumed to be the fundus of the human eye. In a live subject, the fundus is the only organ with a structure that enables its blood vessels to be directly observed from the exterior without an excision. As such, the fundus is well-suited for the purpose of measuring blood flow velocity in vivo.

In FIG. 4, reference numeral 21 denotes a laser light source that produces coherent light. A laser beam 2 produced by the laser light source 21 passes through a lens 23 and impinges on an AOD 24 (corresponding to the AOD 4 of FIG. 1) and is deflected to scan in one dimension (horizontally). The lens 23 is for shaping the laser beam for the rectangular aperture of the AOD 24, and incorporates a multiplicity of cylindrical lenses. The laser beam deflected by the AOD 24 is returned to its original circular shape by a lens 25 which is constituted analogously to the lens 23, following which the beam passes through a lens 26 and a slit 27. The slit 27 is for blocking zero-order light (not shown) from the AOD 24 so as to utilize only first-order diffraction light. First-order diffraction light passing through the slit 27 is directed by a lens 28 to a mirror 30 attached to a galvanometer 29 and is thereby scanned in a direction perpendicular to the direction of scanning by the AOD (vertically). The laser beam scanned two-dimensionally by the mirror 30 is passed through a lens 31 and reflected by a mirror 32, and is then projected onto the fundus 34a of an eye 34 by an objective lens 33.

Scanning frequencies of, for example, 15.75 KHz and 60 Hz, corresponding to ordinary NTSC standard television scan rates, are selected for laser beam scanning by the AOD 24 and the mirror 30. As has been explained, in the apparatus of the present invention, high iterative precision of the scanning laser beam is of critical importance. As such, the galvanometer 29 controlling the mirror 30, a mechanical deflector, has to be a very high precision unit provided with position sensors and full feedback control.

Part of the reflected light from the eye fundus 34a that passes through the objective lens 33 is reflected by a small mirror 35 adjacent to the mirror 32, passes through a detection aperture 36 and a filter 37 and is detected by an optical detector 38. The purpose of the detection aperture 36 is to detect a representative portion of the detailed structure of the speckle pattern arising from interference between rays of light scattering from the various points in the fundus. The filter 37 only transmits light having the wavelength component of the laser beam. The signals output by the optical detector 38 contain information on movement in the eye fundus, i.e., blood flow information.

The major part of the reflected light from the fundus 34a passes around the periphery of the mirror 32, through a lens 39 and a filter 40 adapted to the wavelength of the laser beam, and is detected by an optical detector 41. The detector 41 has a detection aperture that is sufficiently larger than the fine structure of the speckle pattern, so the information detected is that of the normal reflection characteristics of the fundus.

Figure 5:
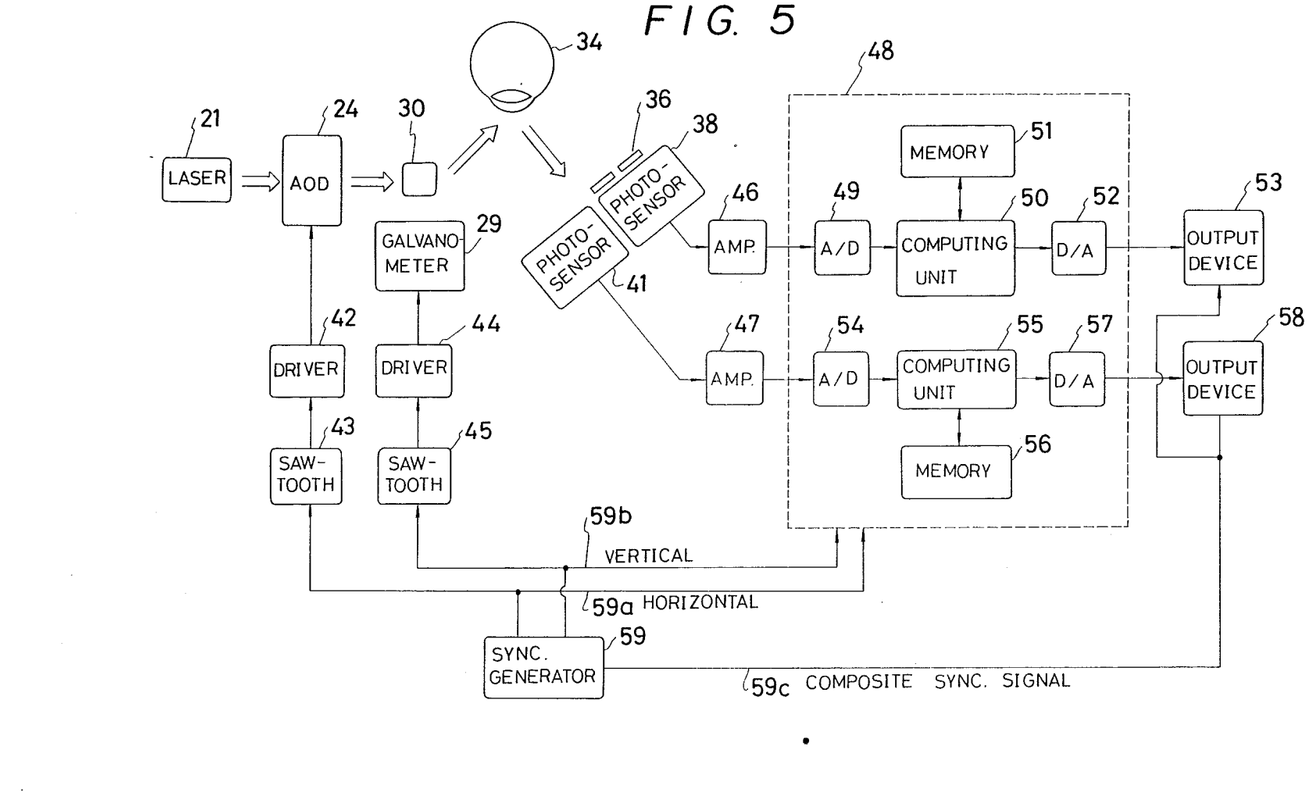
FIG. 5 is a block diagram showing the electrical configuration of the apparatus of the invention.

FIG. 5 is a block diagram showing the electrical configuration of the apparatus the optical system of which is illustrated by FIG. 4. The laser beam from the laser light source 21 is scanned two-dimensionally by the AOD 24 and the mirror 30 attached to the galvanometer 29 and is then projected onto the fundus of the eye 34. Connected to the AOD 24 is a corresponding driver 42 which is controlled by sawtooth waveforms produced by a sawtooth waveform generator 43, and connected to the galvanometer 29 is a corresponding driver 44 which is controlled by sawtooth waveforms produced by a sawtooth waveform generator 45. Part of the reflected light from the fundus of the eye 34 passes through the detection aperture 36 and the filter 37 and is detected by the detector 38, while the major part of the reflected light is detected by the detector 41. As explained before, the optical detector 38 is provided to obtain information on movement in the eye fundus, that is, blood-flow information, while the detector 41 is for obtaining information relating to the normal reflection characteristics of the fundus. The output signals from these detectors are amplified to a prescribed level by respective amplifiers 46 and 47 and are then input to a signal processor 48 constituted of A/D-D/A converters, an arithmetic section, storage memories and the like.

After the output signal from the detector 38 has been converted to 8-bit digital data, for example, by the A/D converter 49 in the signal processor 48, it is input to an computing unit 50, where subtraction, calculation of absolute values and averaging are performed as well as noise reduction processing. As already explained with reference to FIG. 3, the movement of scattering bodies in the object, meaning the state of the blood flow in the fundus, can be quantified by the calculation:

$$I' = 1/n \ \Sigma_n \ | I_{n+1}(t) - I_n(t) |$$

In addition, the data thus obtained is based on a signal produced by the optical detector 38 picking up and photoelectrically converting weak light passing through the small detection aperture 36, and as such this data contains a fair amount of shot noise. An electrical space filter is used to improve the S/N ratio and reduce the noise component. Data is exchanged between a computing unit 50 and a storage memory 51. The memory 51 consists of an amount of frame memory equivalent to several screens, and is used for data being processed during computing operations and for storing the final results. The results of calculations are converted to analog signal form by the D/A converter 52 and are then sent to an output device 53 such as a television monitor whereby the velocity distribution of the blood flow in the fundus is displayed as different shades for evaluation purposes.

The output signal from the detector 41 is converted to digital data by an A/D converter 54 in the signal processor 48, and is then input to a computing unit 55. Data exchange takes place between the computing unit 55 and a storage memory 56 as averages are being computed, which serves to improve the S/N ratio.

This computation of averages may not be required if the object is to obtain ordinary image data. The computation results are sent to a D/A converter 57, and after being converted to analog signal form are sent to an output device 58 such as a television monitor where they are displayed as fundus reflection characteristics, i.e., ordinary fundus images.

The control system of the two-dimensional scanning of the laser beam and the signal processing and output system on the photodetection side are synchronized by a horizontal synchronizing signal 59a, a vertical synchronizing signal 59b and a composite synchronizing signal 59c provided by a synchronizing signal generator 59, which enables time-based control of the overall system to be exercised.

In the apparatus of FIGS. 4 and 5 the period for computing the values of absolute variations in detection signals is based on the number of image frames as determined by the scanning frequency of the mirror 30 driven by the galvanometer 29. As such, for measuring the distribution of the blood flow in the fundus, the duration of the period for totaling and averaging the detection signals has to be a period equal to at least the duration of 15 to 20 frames. Assuming, for example, the laser beam scan rates conform to the ordinary NTSC system television scan rates, this means at least 0.5 second is required. During this period the fundus has to remain completely stationary. Any movement of the fundus, such as would be caused by eyeball movement, would become superimposed on the blood flow distribution, producing unreliable results. Hence, when using the apparatus of this invention to measure blood flow distribution in the fundus of subjects with insufficient eye fixation, it is efficient to use contact lens or the like to keep the eye still. With the type of apparatus shown in FIGS. 4 and 5 it is possible to obtain, as fundus blood flow distribution, data for evaluating whether there is an interruption in the blood flow in the blood vessels in the fundus, and this can be done at the same time as the measurement of fundus image data representing ordinary reflection characteristics.

As has been explained in the foregoing, the velocity distribution measurement apparatus according to this invention has a number of outstanding features. Compared to the laser Doppler method, the optical system is easy to adjust; even when many points are being measured, corresponding to the pixel count of a two-dimensional television screen, measurement and processing can be accomplished in a relatively short time, and the object does not need to be moved. Also, a high-quantum-efficiency point-type photodetector such as a photomultiplier or the like is used, which enables it to be used for objects having a low reflectivity or transmissivity, such as the living fundus. In addition, velocity distribution characteristic data can be measured at the same time as image data showing the normal reflection characteristics.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A velocity distribution measurement apparatus which directs light toward an object, detects scattered light from the object, photoelectrically concerts the light and subjects it to signal processing to obtain velocity distribution characteristics in the object, comprising:
   a light source for generating coherent light;
   an optical deflector for scanning the coherent light at a predetermined frequency;
   an optical system for projecting toward the object the coherent light scanned by the optical deflector;
   an optical detector for detecting a speckle pattern formed in light which is scattered from the object and which passes through a limiting aperture; and
   signal processing means for analyzing from output signals of the optical detector the state of speckle pattern variations at each frequency at which the optical deflector performs scanning, in order to obtain information on velocity distribution in the object.

2. The velocity distribution measurement apparatus according to claim 1 wherein the optical deflector is an acousto-optical deflector.

3. The velocity distribution measurement apparatus according to claim 1 wherein the signal processing means include computation means for performing the respective operations of subtraction, calculation of absolute values and averaging.

4. A velocity distribution measurement apparatus which directs light toward an object, detects scattered light from the object, photoelectrically converts the light and subjects it to signal processing to obtain velocity distribution characteristics in the object, comprising:
   a light source for generating coherent light;
   a first optical deflector for scanning the coherent light at a predetermined frequency;
   a second optical deflector for scanning the coherent light at a predetermined frequency in a direction that is perpendicular to the direction of scanning by the first optical detector;
   an optical system for projecting toward the object the coherent light scanned two-dimensionally by the first and second optical deflectors;
   a first optical detector for detecting a speckle pattern formed in light which is scattered from the object and which passes through a limiting aperture;

first signal processing means for analyzing from output signals of the first optical detector the state of speckle pattern variations in order to obtain information on velocity distribution in the object;

a second optical detector for detecting light which is reflected from or transmitted through the object; and second signal processing means for developing from output signals of the second optical detector two-dimensional image data showing optical reflection or transmission characteristics in the object.

5. The velocity distribution measurement apparatus is an acousto-optical deflector.

6. The velocity distribution measurement apparatus according to claim 4 wherein the second optical deflector is a mirror attached to a galvanometer.

7. The velocity distribution measurement apparatus according to claim 4 wherein the first signal processing means include computation means for performing the respective operations of subtraction, calculation of absolute values and averaging.

8. The velocity distribution measurement apparatus according to claim 7 wherein a period for computing means of the averaging is based on image frames as determined by the scanning frequency of the second optical deflector.

9. The velocity distribution measurement apparatus according to claim 4 wherein the scanning frequency of the second optical deflector is lower than the scanning frequency of the first optical deflector.

10. A movement measuring apparatus comprising:
means for scanning an object with a beam of coherent light at a predetermined scanning frequency wherein the object has light scattering bodies therein for producing a speckle pattern of scattered light for each scan;

a limiting aperture through which passes the speckle pattern from the object for each scan;

optical detecting means receptive of the speckle pattern passing through the limiting aperture for producing an output signal corresponding thereto; and signal processing means receptive of the output signal for each scan for producing information corresponding to velcoity distribution in the object from the comparison of output signals of previous scans.

11. The apparatus according to claim 10, wherein the means for scanning comprises a laser light source and an acoustic optical deflector for scanning the beam from the laser light source.

12. The apparatus according to claim 10, wherein the signal processing means comprises means for subtracting output signals from consecutive scans, means for calculating the absolute value of the subtractions and means for averaging the absolute values.

13. A movement measuring apparatus comprising:
means for scanning an object with a beam of coherent light at a first predetermined scanning frequency in a first direction and for scanning the object with the beam of light at a second predetermined scanning frequency in a second direction perpendicular to the first direction, wherein the object has light scattering bodies therein for producing a speckle pattern of scattered light for each scan in the first direction and reflects or transmits light for each scan in the second direction;

a limiting aperture through which passes the speckle pattern from the object for each scan in the first direction;

first optical detecting means receptive of the speckle pattern passing through the limiting aperture for producing a first output signal corresponding thereto;

second optical detecting means receptive of reflected or transmitted light from each scan in the second direction for producing a second output signal corresponding thereto;

first signal processing means receptive of the first output signal for each scan in the first direction for producing information corresponding to velocity distribution in the object from the comparison of output signals of previous scans; and second signal processing means receptive of the second output signal for each scan in the second direction of producing two-dimensional image data of reflection or transmission characteristics in the object.

14. The apparatus according to claim 13, wherein the means for scanning in the first direction comprises an acoustic-optical deflector.

15. The apparatus according to claim 13 wherein the means for scanning in the second direction comprises a mirror and a galvanometer attached thereto.

16. The apparatus according to claim 13, wherein the first signal processing means comprises means for subtracting first output signals from consecutive scans in the first direction, means for calculating the absolute value of the subtractions and means for averaging the absolute values.

17. The apparatus according to claim 16, wherein a period over which the absolute values are averaged is determined by the second predetermined scanning frequency.

18. The apparatus according to claim 13, wherein the second predetermined scanning frequency is less than the first predetermined scanning frequency.

* * * * *